Patented Feb. 13, 1951

2,541,473

UNITED STATES PATENT OFFICE 2,541,473

3 - AMINOMETHYL - 2 - HYDROXY - 1,4 - NAPHTHOQUINONES AND THEIR PRODUCTION

Marlin T. Leffler, Lake Bluff, Ill., assignor, by mesne assignments, to Research Corporation, New York, N. Y., a corporation of New York No Drawing. Application March 19, 1946,
Serial No. 655,604

10 Claims. (Cl. 260—294.7)

The present invention relates to new physiologically active naphthoquinone compounds of particular interest in the chemotherapeutic art.

The principal object of the present invention is to provide physiologically active naphthoquinone compounds adaptable for use in the chemotherapeutic art.

A more specific object of the present invention is to provide compounds for use in combatting parasitic infections including those prevalent in various avian species.

Other objects of the present invention will be apparent from the detailed description hereinafter.

The compounds of the present invention are 3-substituted -2-hydroxy - 1,4 - naphthoquinones and may be represented by the following formula:

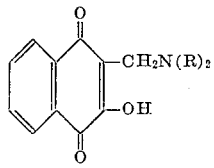

where R represents hydrogen, an alkyl group such as methyl, ethyl, propyl, isopropyl, butyl, amyl, hexyl, decyl, etc., including substituted alkyl groups such as the hydroxy alkyls, aralkyls, etc., cyclic groups includ'ng alicyclics such as cyclo-hexyl, and heterocyclics such as dioxanyl, and where the R's together with the N atom form a heterocyclic ring such as morpholino, piperidino including alkyl substituted piperidino, etc.

The compounds of the present invention may be prepared by the well known Mannich reaction. This reaction involves the reaction of an aldehyde and an amine with lawsone (2-hydroxy-1,4-naphthoquinone) and may be illustrated by the following example.

EXAMPLE

*2-hydroxy-3-piperidino-methyl-1,4-naphthoquinone*

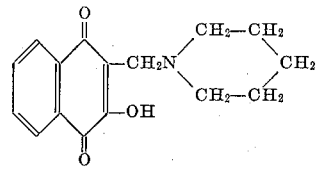

To about 9 grams of piperidine in 100 cc. of ethyl alcohol is added about 17.4 grams of 2-hydroxy-1,4-naphthoquinone (lawsone). The resulting solution is cooled and stirred and maintained at about 25° to 30° C. while adding dropwise about 8.5 cc. of 37 per cent formalin. After stirring at room temperature for about one-half hour, the reaction mixture is next refluxed on a steam bath for about two hours and then allowed to stand at room temperature over night. The heavy, deep red precipitate that forms is separated from the reaction mixture by filtration and washed well with cold water. The product obtained i. e., crude 2-hydroxy-3-p'peridino-methyl-1,4-naphthoquinone, may be purified by recrystallization from 85 per cent methanol, yielding orange prisms melting at about 196°–197° C.

Experiments have demonstrated the 3-piperidino-methyl compound described above to be characterized by low toxicity and to be effective against certain types of parasitic infections. With this compound, for example, it has been found that avian infections such as *P. lophurae* may be controlled by oral administration at dosage levels of about 75 mg. per kg.

Examples of other illustrative compounds of the present invention are given in table form below:

TABLE

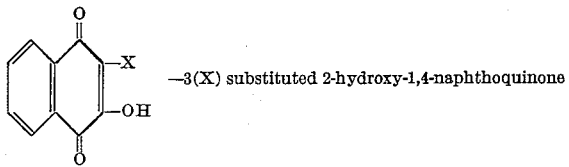

—3(X) substituted 2-hydroxy-1,4-naphthoquinone

| X | Name of 3-substituent | Melting Point, °C. |
|---|---|---|
| $CH_2-N=(CH_3)_2$ | dimethylamino-methyl | 193–194 (decomp). |
| $CH_2-\overset{H}{N}-C_4H_9$ | n-butylamino-methyl | 157–158. |
| $CH_2-\overset{H}{N}-C_5H_{11}$ | n-amylamino-methyl | 159–160 (decomp). |
| $CH_2-\overset{H}{N}-C_{10}H_{21}$ | n-decylamino-methyl | 148–149 (decomp). |
| $CH_2-\overset{H}{N}-CH_2CH_2OH$ | β-hydroxyethylamino-methyl. | 168 (decomp). |
| $CH_2-\overset{H}{N}-CH_2C_6H_5$ | benzylamino-methyl | 149–150 (decomp). |
| $CH_2-\overset{H}{N}-CH\begin{smallmatrix}CH_2-CH_2\\ \\CH_2-CH_2\end{smallmatrix}CH_2$ | cyclohexylamino-methyl | 185–190 (decomp). |
| $CH_2-\overset{H}{N}-\underset{CH_3}{\overset{}{C}}H\begin{smallmatrix}CH_2-O\\ \\CH_2-O\end{smallmatrix}CH_2$ | 5-methyl-1,3-dioxanyl-5-amino-methyl. | 195 (decomp). |
| $CH_2-N\begin{smallmatrix}CH_2-CH_2\\ \\CH_2-CH_2\end{smallmatrix}O$ | morpholino-methyl | 185 (decomp). |
| $CH_2-N\begin{smallmatrix}CH_2-CH_2\\ \\CH-CH_2\\ \\CH_3\end{smallmatrix}CH_2$ | α-methylpiperidino-methyl | 165 (decomp). |
| $CH_2-N\begin{smallmatrix}CH_2-CH_2\\ \\CH_2-CH_2\end{smallmatrix}CH-CH_3$ | γ-methylpiperidino-methyl | 183.5–184 (decomp). |

The compounds listed above may be prepared by the Mannich reaction in accordance with the example given above by reacting the appropriate amine with formaldehyde and lawsone. The use of dimethylamine in place of piperidine, for example, will give the product 3-dimethylamino-methyl-2-hydroxy-1,4-naphthoquinone, which is the first compound listed in the above table. The substitution of ethylmethylamine for dimethylamine similarly will give the product 3-ethyl-methylamino-methyl-2-hydroxy-1,4-naphthoquinone.

The compounds of the present invention are amphoteric, being soluble in both acids and alkalies. The 2-hydroxy-3-piperidino-methyl-1,4-naphthoquinone product gives a yellow solution in hydrochloric acid and a deep red solution in sodium hydroxide. The orange color of the free piperidino compound is probably due to internal salt formation i. e., the existence of a "zwitterion," as represented by the formula:

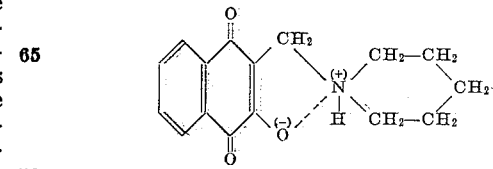

Without further elaboration, the foregoing will so fully explain my invention that others may readily adopt the same for use under various conditions of service.

I claim:
1. Compound of the general formula

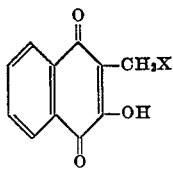

wherein X is a basic nitrogen-containing group having its nitrogen attached to the methylene carbon and selected from lower alkyl- and di-alkylamino groups, cycloalkylamino groups, piperidino, alkylpiperidino, morpholino and 5-methyl-1,3-dioxanyl-5-amino groups.

2. A 3 - alkylamino - methyl - 2 -hydroxy- 1,4- naphthoquinone.

3. The product, 3-dimethylamino-methyl-2-hydroxy-1,4-naphthoquinone.

4. A 2-hydroxy-1,4-naphthoquinone having a piperidino-methyl substituent at the 3-position.

5. The product, 3 - piperidino-methyl-2-hydroxy-1,4-naphthoquinone.

6. A 3-alkylpiperidino-methyl-2-hydroxy-1,4-naphthoquinone.

7. The product, 3-α-methylpiperidino-methyl-2-hydroxy-1,4-naphthoquinone.

8. The product, 3-γ-methylpiperidino-methyl-2-hydroxy-1,4-naphthoquinone.

9. The product of claim 2 where the alkyl is a decyl group.

10. The method which comprises reacting 2-hydroxy-1,4-naphthoquinone with formaldehyde and a nitrogen-containing base selected from the group consisting of lower alkyl- and di-alkylamines, cycloalkylamines, piperidine, alkylpiperidines, morpholine, and 5-methyl-1,3-dioxanyl-5-amine and recovering from the reaction product the corresponding 3-substituted compound of the general formula

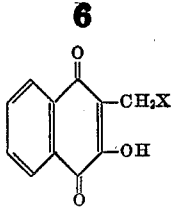

wherein X is a basic nitrogen-containing group having its nitrogen attached to the methylene carbon and selected from lower alkyl- and di-alkylamino groups, cycloalkylamino groups, piperidino, alkylpiperidino, morpholino and 5-methyl-1,3-dioxanyl-5-amino groups.

MARLIN T. LEFFLER.

REFERENCES CITED

The following references are of record in the file of this patent:

UNITED STATES PATENTS

| Number | Name | Date |
|---|---|---|
| 1,824,676 | Mannich | Sept. 22, 1931 |
| 1,913,621 | Williams et al. | June 13, 1933 |
| 2,040,039 | Bruson | May 5, 1936 |
| 2,040,040 | Bruson | May 5, 1936 |
| 2,056,046 | Fourneau | Sept. 29, 1936 |
| 2,220,834 | Bruson et al. | Nov. 5, 1940 |
| 2,260,265 | Senkus | Oct. 21, 1941 |
| 2,284,118 | Bock | May 26, 1942 |
| 2,366,611 | Grun | Jan. 2, 1945 |

FOREIGN PATENTS

| Number | Country | Date |
|---|---|---|
| 422,916 | Germany | Dec. 15, 1925 |
| 673,949 | Germany | Mar. 31, 1939 |

OTHER REFERENCES

Forneau: Chimie et Industrie, vol. 39 (No. 6), pp. 1054 (170T) and 1056 (172T), 1938, June, complete article 1051–1061 (167T–173T).

Schonhofer: Zeit. Physiol. Chem., vol. 274, p. 3 (1942) (complete article pp. 1–8).